United States Patent [19]

Newell

[11] 4,039,805
[45] Aug. 2, 1977

[54] APPARATUS FOR CALCULATING THE PRICE OF MEASURED LENGTHS OF MATERIAL

[75] Inventor: John A. Newell, St. Louis County, Mo.

[73] Assignee: The Measuregraph Company, St. Louis, Mo.

[21] Appl. No.: 562,764

[22] Filed: Mar. 27, 1975

[51] Int. Cl.² .................. G06F 15/20; G01B 3/12
[52] U.S. Cl. .................. 235/151.32; 33/133; 235/92 DM; 235/92 DN; 356/169
[58] Field of Search ....... 235/151.32, 92 DN, 92 EV, 235/92 DM; 33/129, 133; 356/169, 170; 250/237 G

[56] References Cited

U.S. PATENT DOCUMENTS

| | | | |
|---|---|---|---|
| 3,768,911 | 10/1973 | Erickson | 235/92 DN |
| 3,787,981 | 1/1974 | Somogye, Jr. | 33/133 |
| 3,808,431 | 4/1974 | Hedrick | 356/170 |
| 3,912,926 | 10/1975 | Coulbourn | 250/237 G |
| 3,916,174 | 10/1975 | Moule | 235/151.32 |
| 3,944,821 | 3/1976 | Pierrat | 250/237 G |
| 3,965,340 | 6/1976 | Renner et al. | 235/92 DN |
| 3,982,105 | 9/1976 | Eberle | 235/92 DN |

Primary Examiner—Malcolm A. Morrison
Assistant Examiner—Errol A. Krass
Attorney, Agent, or Firm—Koenig, Senniger, Powers and Leavitt

[57] ABSTRACT

Apparatus for calculating the price of a measured length of material comprising a sensor for detecting the movement in either of two directions of a material having a length to be measured and a price per unit length. The unit price of the material is entered into the apparatus and a binary value related thereto is derived. Logic components responsive to the sensor determine the direction of material movement and provide a first signal representative of the distance the material moves in a forward direction and a second signal representative of the distance the material moves in a reverse direction. An output signal representing the total price of the measured length of material is provided in response to the first and second signals and the binary value derived from the unit price. A display responds to the output signal to indicate the total price of the measured length of material.

1 Claim, 6 Drawing Figures

APPARATUS FOR CALCULATING THE PRICE OF MEASURED LENGTHS OF MATERIAL

BACKGROUND OF THE INVENTION

This invention relates to apparatus for measuring lengths of material and more particularly to an apparatus for electronically determining the price of measured lengths of material.

Machines for measuring and computing the cost of a material, such as cloth or other fabric, typically employ a measuring roll and a contact roll to grip the material. The measuring roll rotates as a material is drawn between the rolls and drives a gear train which, in turn, drives indicator dials which register the length of material drawn. The gear train also drives a price chart (such as a roller chart) which has suitable scales from which can be determined the total price of the material measured. These machines are limited in utility since they can only be used to measure out relatively large fractional yardage increments of material, such as eighths of yards, and can determine price only according to certain relatively large price increments, such as 10 cents, e.g., because of the necessarily limited number of chart scales which can be provided for use with the machine. If no price chart is provided with the machine, or the roller chart does not include a particular price, then the price determination for a measured length of material must be done by the operator or salesperson either by long hand computation or by use of a calculator.

Automatic electronic price computing apparatus has been employed for weighting scales as shown in U.S. Pat. Nos. 2,963,222 to Allen and 3,084,285 to Bell et al. However, the apparatus shown in these patents are not useful for length measuring because both disclose only methods of sensing unidirectional movement of their respective apparatus and determining price thereby. Neither discloses a method of sensing movement in either of two directions and computing a price with respect to the movements in either of these directions.

SUMMARY OF THE INVENTION

Among the several objects of the invention may be noted the provision of a material measuring and price calculating apparatus which electronically computes the cost of a measured length of material; the provision of such apparatus which permits a measured length of material to be increased and decreased as desired and which electronically computes the total price for any measured length; the provision of such apparatus which permits measuring and calculation of a material price for relatively small incremental changes of length; the provision of such apparatus which accurately computes the total price of material at a price per unit length settable in relatively small price increments; the provision of such apparatus which recomputes the total price of an already measured and priced length of material without having to remeasure material length; and the provision of such apparatus which is relatively simple in design, reliable in operation, and inexpensively constructed. Other objects and features will be in part apparent and in part pointed out hereinafter.

Briefly, the apparatus of the present invention comprises sensing means for detecting movement in either of two directions of a material having a length to be measured and a price per unit length. The unit price of the material is entered into the apparatus and a binary value related thereto is derived. Logic means responsive to the sensing means determines the direction of material movement and provides a first signal repesentative of the distance the material moves in a forward direction and a second signal representative of the distance the material moves in a reverse direction. Means responsive to the first and second signals and the binary value derived from the unit price provide an output signal representing the total price of the measured length of material. Display means are provided which in response to the output signal indicate the total price of the measured length of material.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
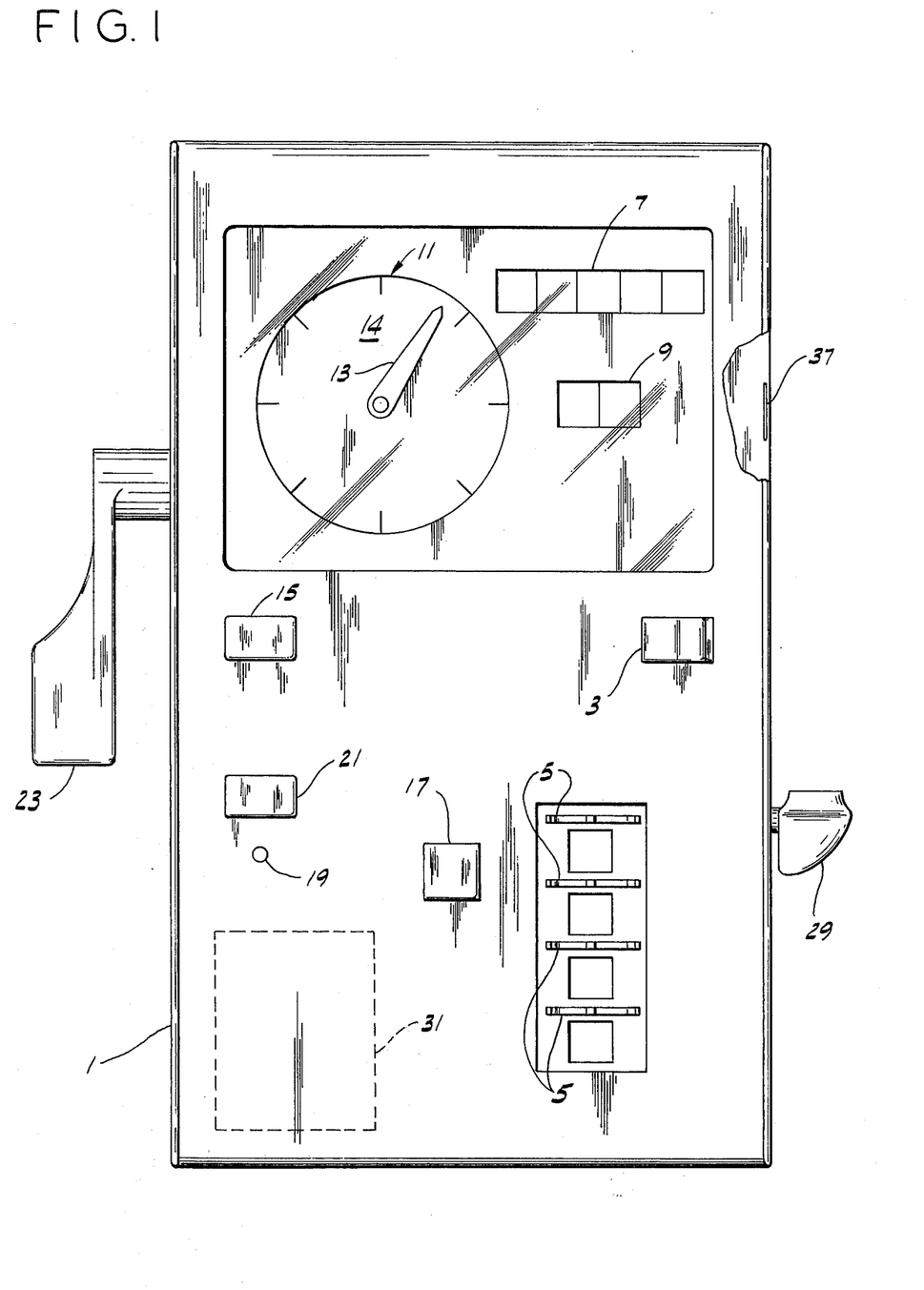
FIG. 1 is a top plan view of a control and display console of apparatus of the present invention.

Referring now to the drawings and more particularly to FIG. 1, a control and display console of the present invention is indicated generally at 1. Included on console 1 are an on/off switch 3, a set of price per yard thumbwheel switches 5, a total price indicator 7, a whole yardage indicator 9, a fractional yardage indicator 11 including an indicator pointer or hand 13 and a dial face 14 on which fractional unit markings are inscribed, a reset switch 15, a recompute switch 17, a bolt end indicator light 19, and a bolt end switch 21. Duplicates of total price indicator 7 whole yards indicator 9 and fractional yards indicator 11, hand 13 and dial face 14 are located on the front side of the console so as to be viewed by a customer. Also shown in FIG. 1 are a start lever 23 for lowering a contact roll 25 (FIG. 2) into a material gripping position by means of a linkage assembly as represented by the dashed line 27 in FIG. 2, a shear lever 29 for notching material, and an electronics unit 31 (dashed line) for performing price calculations.

Figure 2:
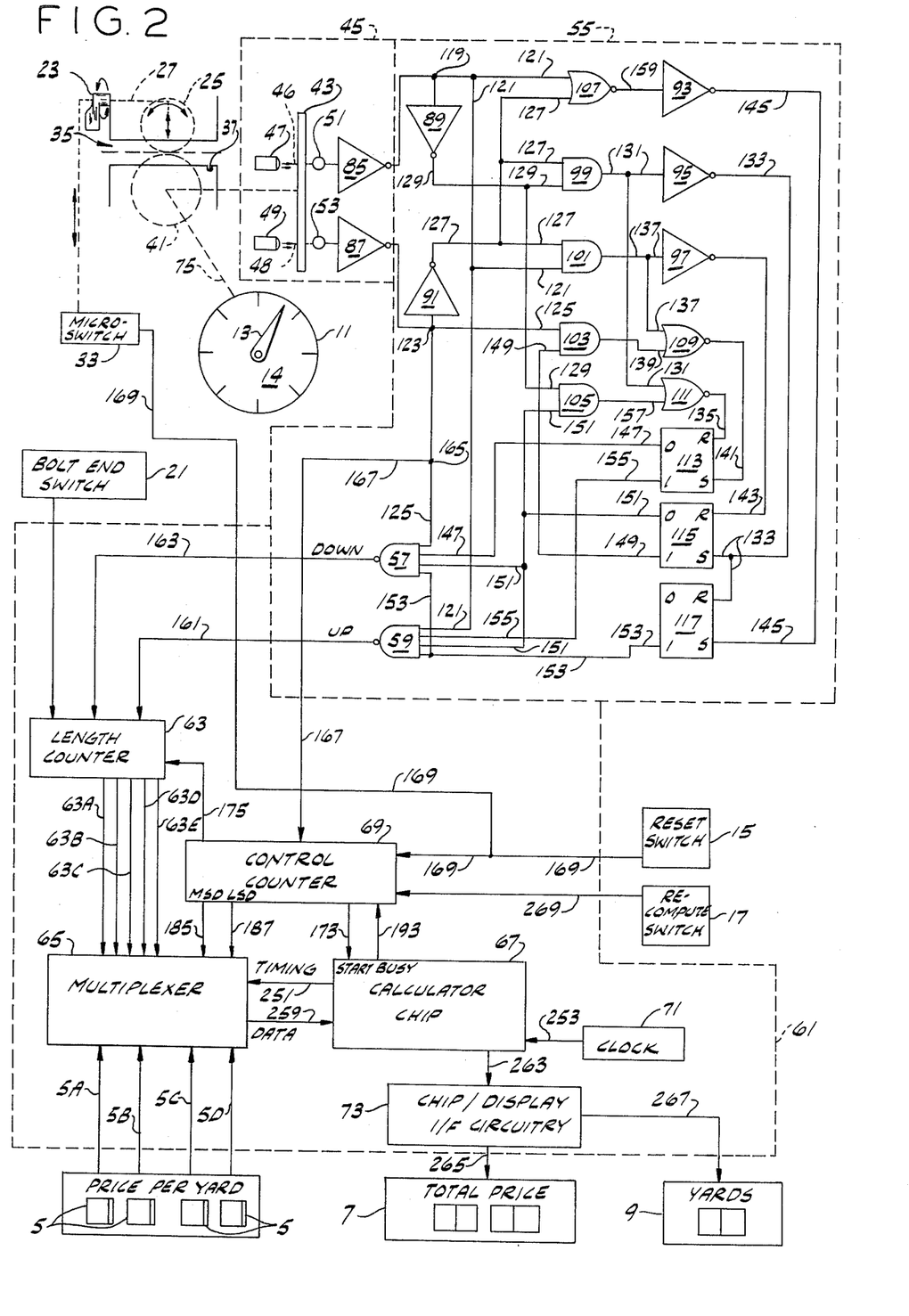
FIG. 2 is a block diagram of the direction sensing and price calculation system of the apparatus of FIG. 1.

In FIG. 2 there is shown a microswitch 33 which is actuated by a movement of start lever 23 as will be described, and a throat 35 through which material is inserted and on the base of which is inscribed a reference line 37. The entire console assembly 1 is mounted on a table.

To measure a length of material and electronically compute the price thereof, an operator or salesperson first verifies or positions switch 3 to "on". Next, the operator depresses reset switch 15 which supplies an electrical pulse to electronics unit 31 to insure that the electronics unit is reset and ready to perform price calculations. Thumbwheel switches 5 are adjusted until the desired price per yard of the material is displayed.

This sets a unit price value into electronics unit 31 for computing prices. Depressing shear lever 29 after the previous measurement and sale of material moves contact roll 25 to a position wherein it is spaced from a measure roll 41 so that material may be drawn through the throat 35 of the assembly 1. The operator then inserts the loose end of the material through the throat 35 and aligns the leading edge thereof with reference line 37 on the base of throat 35. Start lever 23 is depressed to lower contact roll 25 into position to grip the material. This action actuates microswitch 33 which supplies a pulse to electronics unit 31 for the same purpose as the pulse generated by depressing reset switch 15. Thus, if the operator neglects to depress reset switch 15, electronics unit 31 is still reset. Material is then drawn through the unit until a desired length, as indicated by whole yards indicator 9 and hand 13 of the fractional yards indicator 11, has been measured. Throughout the entire measurement period, electronics unit 31 calculates the total price based upon the price per yard of the material and the amount of length measured. The unit is responsive to the forward or reverse movement of material to adjust the total price display 7 indicator accordingly. After the desired length has been measured, shear lever 29 is depressed by the operator to notch the material to indicate where it is to be cut. If, after a measurement is completed, it is discovered that an incorrect price per yard had been set with the thumbwheel switches 5, the operator can readjust the switches to indicate the correct unit price and then by depressing recompute switch 17, have elecronics unit 31 recalculate and display the correct total price.

If the end of a bolt is reached during a length measurement, the bolt end indicator light 19 is illuminated. This indication informs the operator to depress bolt end switch 21 which provides an input to the electronics unit 31 to cause it to compensate for a two inch offset between the center line of measuring roll 41 and reference line 37 in making price computations.

Referring to FIG. 2, an optically encoded disk 43 of a direction sensor 45 is mechanically coupled to measuring roll 41 as indicated by dashed line 44 and rotates therewith. Disk 43 is interposed along optical paths as indicated at 46 and 48 between light sources 47 and 49 and light detectors 51 and 53 to transmit or block the passage of light therebetween. The output of detectors 51 and 53 are inputs to a logic network 55 which responds to the inputs to provide first and second signals from NAND gates 57 and 59 to a price calculator 61. Price calculator 61 includes a conventional five digit length counter 63 which receives outputs from NAND gates 57 and 59, a multiplexer 65 which takes length inputs from counter 63 and price inputs from price per yard thumbwheel switches 5, a calculator chip 67 which performs price computations based on inputs from multiplexer 65, a control counter 69 which controls the sequence of information flow between multiplexer 65 and chip 67, a clock 71 to provide timing signals to chip 67, and interface circuitry 73 for applying the output of chip 67 to total price indicator 7 and whole yards indicator 9. Logic network 55 and price calculator electronics 61 comprise the electronics unit 31 shown in FIG. 1. Dial face 14 of fractional yardage indicator 11 is calibrated in eighths of yards. Hand 13 is driven by a gear train represented by dashed line 75. The gear train is coupled to a shaft which is driven by measuring roll 41. Thus, as material is drawn between rolls 25 and 41, hand 13 will rotate around dial face 14 to indicate the eighths of yards of material measured.

The purpose of the start lever 23, microswitch 31, and reset and recompute switches 15 and 17, shown in FIG. 2, has been previously discussed with relation to FIG. 1.

The entire direction sensing and price calculation system is responsive to the movement of a material an incremental distance (0.1 inch) in either direction between rolls 25 and 41 to increment or decrement the contents of length counter 63 and initiate a price computation based on the contents of length counter 63 and the price per yard set by thumbwheel switches 5. The system operation will now be discussed in more detail.

Figure 3:
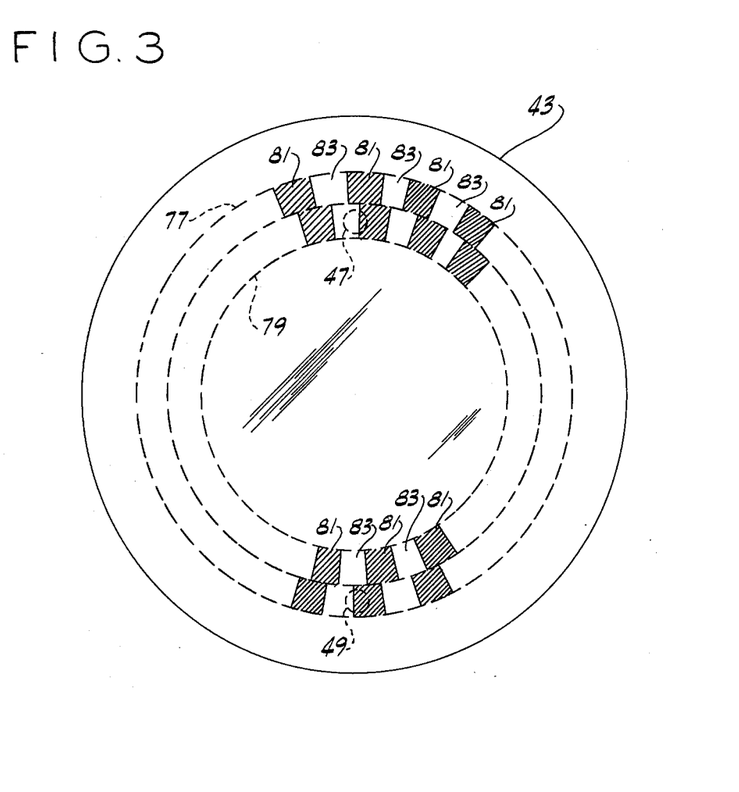
FIG. 3 is a plan view of an optically encoded disk used for sensing the direction of movement of material.

As shown in FIG. 3, disk 43 has two concentric optically encoded or photographically engraved bands or rings 77 and 79 each of which has alternating opaque and light-transmitting zones 81 and 83 respectively. Further, the opaque and light-transmitting zones of the outer concentric ring 77 are shifted with respect to those of inner concentric ring 79. This phase shift is equivalent to 90 electrical degrees for reasons to be discussed hereinafter. Light source 47 and light detector 51, which is a phototransistor, are aligned so that the passage of light between them is controlled by the zones of inner concentric ring 79. Similarly, light source 49 and light detector 53, also a phototransistor, are aligned so that passage of light between them is controlled by the zones of outer concentric ring 77.

The purpose for the two optically encoded rings and the resultant electrical phase shift between them is to establish a sequence of light transmissions and interruptions which will be converted to corresponding electrical levels by phototransistors 51 and 53. Phototransistors 51 and 53 produce a logic high output when the presence of light from sources 47 and 49 is sensed and a logic low output when passage of light is blocked. Inverters 85 and 87 invert the logic level outputs of phototransistors 51 and 53 respectively and the inverter outputs are inputs to logic network 55. Logic network 55 determines from the sequence of logic level changes the direction of movement of material between rolls 25 and 41 and when the material has moved an incremental distance (0.1 inch) in either a forward or reverse direction.

Logic network 55 includes inverters 89, 91, 93, 95, and 97, NAND gates 99, 101, 103, and 105, NAND gates 57 and 59, NOR gates 107, 109, and 111, and flip flops 113, 115, and 117. The truth tables for these logic elements are well known in the art. The network is so designed that when disk 43 has rotated an amount equivalent to the passage of an incremental amount of material (0.1 inch) between rolls 25 and 41 a first signal is provided at the output of NAND gate 59 on line 161 if the movement was in a forward or length increasing direction, or a second signal is provided at the output of NAND gate 57 on line 163 if the movement was in a reverse or length decreasing direction. These output signals are inputs to length counter 63 to either increment or decrement the contents thereof. The output of either NAND gate is high so long as any input thereto is low. Only when all inputs to either NAND gate are high will that gate's output go low. It is this transition from high to low which indicates that material has moved an incremental distance in the appropriate direction.

Figure 4:
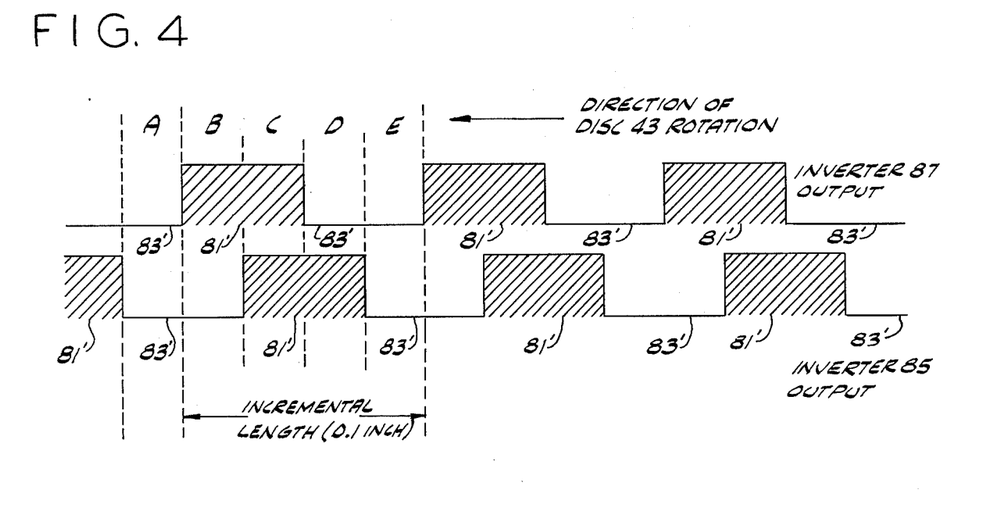
FIG. 4 illustrates the phase relationship between first and second electrical signals provided by the direction sensor.

The operation of logic network 55 is illustrated by referring to FIG. 4 which shows the sequence of outputs of inverters 85 and 87 supplied as inputs to logic network 55. The sequence of outputs of inverter 85 is dependent upon the sequence of light transmission and blockage controlled by the inner concentric ring 79 of disk 43. The sequence of outputs of inverter 87 is dependent upon the sequence of light transmission and blockage controlled by the outer concentric ring 77 of disk 43. The direction of disk 43 rotation shown in FIG. 4 for an increasing length of material is indicated by the arrow. For easier cross reference between FIG. 3 and FIG. 4 the cross-hatched areas 81' of the inverters 85 and 87 outputs shown in FIG. 4 represent the outputs of the inverters for the passage of the opaque zones 81 of each concentric ring 77 and 79 in FIG. 3 between the light source and light detector associated with that ring. Similarly, the portions of the output of the inverters 85 and 87, indicated by 83' in FIG. 4 denote the passage of the light-transmitting zones 83 of each concentric ring 77 and 79 between the light sources and light detector associated with that ring.

Assume that initially disk 43 is at a position A in FIG. 4 so that light passes between both light sources 47 and 49 and phototransistors 51 and 53. The outputs of inverters 85 and 87 are a logic low at 119 and 123 respectively. The logic low at 119 means that the input on 121 to NAND gate 59 is low. Similarly, the low at 123 means that input 124 to NAND gate 57 is low. Therefore, both NAND gates 57 and 59 have at least one low input so that the output of each gate is high, and no output is supplied on either line 161 or 163 to increment or decrement the contents of length counter 63. For the remainder of logic network 55, the logic states created when disk 43 is at position A are as follows:

AND gate 99 will have high inputs on both 127 and 129 to produce a high output on 131, which when inverted by inverter 95, will provide low inputs to flip-flops 115 and 117 on line 133. Further, the high output of gate 99 produces a low output from NOR gate 111 which makes the R input of flip-flop 113 on line 135 low. Since both AND gates 101 and 103 have at least one low input on lines 121 and 125 respectively, both gates have low outputs. NOR gate 109 has low inputs from AND gates 101 and 103 on lines 137 and 139, which produces a high output on line 141 to the S input of flip-flop 113. With a low R input and a high S input, the 0 output of flip-flop 113 is high and its 1 output low. The low output of gate 101 is inverted to provide a high on line 143 to the R input of flip-flop 115. With the R input of flip-flop 115 high and the S input low, the 0 output of flip-flop 115 is low and its 1 output high. Finally, NOR gate 107 has a low and a high input on lines 121 and 127 respectively to produce a low output which is inverted to provide a high on line 145 to the S input of flip-flop 117. With the R and S inputs to flip-flop 117, low and high respectively, the 1 output is low. With these outputs from flip-flops 113, 115 and 117, and the low inputs at 119 and 123, NAND gate 59 has all low inputs and NAND gate 57 has low inputs on all lines except 147 which, as noted, causes both NAND gates 57 and 59 to have high outputs so that no input is supplied to length counter 63.

As disk 43 rotates to position B, the output of inverter 87 goes from low to high, while the output of inverter 85 remains low. Input line 121 to NAND gate 59 remains low thus keeping its output high while input line 125 to NAND gate 57 goes high. The outputs of AND gates 99 and 105 to NOR gate 111 are now both low to produce a high to the R input of flip-flop 113. AND gate 101 output remains low, while AND gate 103 now has a high input on line 125 from inverter 87 and a high input on line 149 from the 1 output of flip-flop 115. The resulting high output of gate 103, together with the low output of AND gate 101 produces a low output from NOR gate 109 to the S input of flip-flop 113. With the R input of flip-flop 113 high and its S input low, the output now changes to a low 0 output and high 1 output. The low output of gate 101 is inverted to provide a high R input to flip-flop 115 as before. The low output of gate 99 is inverted to a high to the S input of flip-flop 115 and the R input of flip-flop 117. With both the R and S inputs of flip-flop 115 high, the outputs remain unchanged with the 0 output low and 1 output high. NOR gate 107 has both inputs low making its output high. Inverter 93 converts the high gate 107 output to a low which is the S input of flip-flop 117. With the R input of flip-flop 117 now high and its S input low, the 1 output now goes high. With flip-flop's 113, 115 and 117 outputs as noted, and with the high at 123 and the low at 119, NAND gate 57 has low inputs on lines 147 and 151, highs on lines 125 and 153, and NAND gate 59 has low inputs on lines 121 and 151 with highs on lines 155 and 153. Since both NAND gates 57 and 59 still have at least one low input, their outputs remain high and no input is provided to length counter 63.

When disk 43 now rotates to position C the output of both inverter 85 and 87 will be high. Both input line 125 to gate 57 and line 121 to gate 59 are high. Both inputs to gate 99 are low, so its output to NOR gate 111 remains low. AND gate 105 has low inputs from inverter 89 and the 0 output of flip-flop 115. The output of gate 105 remains low and both inputs to NOR gate 111 are low, keeping its output to the R input of flip-flop 113 high. AND gate 103 still has both inputs high to maintain its high output to NOR gate 109. AND gate 101 now has a high input from the inverter 85 output, but its input from inverter 91 is still low keeping its output to NOR gate 109 low. Since NOR gate 109 still has a high and a low input, its output to the S input of flip-flop 113 remains low. The R and S inputs of flip-flop 113 are unchanged and its 0 output remains low and its 1 output high. Similarly, the R input to flip-flop 115 remains high because the output of AND gate 101 stays low and is converted to a high by inverter 97. Further, because the output of AND gate 99 has stayed low, the inverter 95 output to the S input of flip-flop 115 and the R input of flip-flop 117 stays high. Flip-flop 115 still has both a high R and S input keeping its outputs unchanged with 0 low and 1 high. With inverters 85 and 87 outputs now both high, NOR gate 107 now has a high and a low input, the low input being the output of inverter 91. The output of NOR gate 107 goes low and is converted by inverter 93 to provide a high to the S input of flip-flop 117. With the R and S inputs of flip-flop 117 both high, the 1 output remains unchanged and high. Now, NAND gate 57 has low inputs on lines 147 and 151, high inputs on lines 125 and 153, and NAND gate 59 has a low input only on line 151. Since both NAND gates 57 and 59 still have at least one low input, their outputs remain high and no input is supplied to length counter 63.

As disk 43 rotates to position D the output of inverter 87 goes low while the output of inverter 85 remains high. The input on line 121 to gate 59 remains high, but the input on line 125 to gate 57 goes low. AND gate 99 now has a high input on line 127 from inverter 91 but its input on line 129 form inverter 89 stays low keeping the output to NOR gate 95 low. AND gate 105 still has a low input on line 129 form inverter 89 so that its output to NOR gate 111 remains low. With both inputs on lines 131 and 157 remaining low, the output of gate 111 to the R input of flip-flop 113 on line 135 remains high. AND gate 101 now has high inputs on both lines 127 and 121 which changes its output to NOR gate 109 on line 137 to high. AND gate 103 now has a low input on line 125 from the inverter 87 output which makes its output on line 139 to gate 109 low. Gate 109 still has a high and a low input which keeps its output on line 141 to the S input of flip-flop 113 low. Thus, the R and S inputs to flip-flop 113 are unchanged and its outputs remain 0 low and 1 high. With AND gate 101 having a high output, the input on 137 to inverter 97 is now high changing the inverter output on line 143 to the R input of flip-flop 115 from high to low. Since the output of AND gate 99 remains low on line 131 to inverter 95, the inverter output on line 133 to the S input of flip-flop 115 and the R input of flip-flop 117 remains high. With the outputs of flip-flop 115 now R low, S high, the output will change to 0 high and 1 low. NOR gate 107 now has high inputs on both lines 121 and 127, so its output remains low on line 159 keeping the inverter 93 output on line 145 to the S input of flip-flop 117 high. Thus, both the R and S inputs of flip-flop 117 remain high and the 1 output remains high. NAND gate 57 has low inputs on lines 125 and 147 and high inputs on lines 151 and 153 so that its output remains high. NAND gate 59, however, now has high inputs on lines 121, 151, 153 and 155 so that its output switches from high to low. This logic level change is provided as an input on line 161 to length counter 63. The output on line 161 is indicative of the forward movement of material or increasing measured length, and will cause length counter 63 to count up or increment it contents. It will be understood that for material movement in a reverse direction or decreasing measured length NAND gate 57 will, at one point in the sequence of inverter 85 and 87 outputs, have all inputs high to provide an output on line 163 to counter 63 to have the counter count down or decrement its contents.

Finally, when disk 43 moves to position E, logic network 55 will be in the same logic configuration as when disk 43 was in position A. As can be seen from FIG. 4, the movement ABCD or BCDE corresponds to the rotation of disk 43 an amount equivalent to the movement of 0.1 inch of material between rolls 25 and 41.

Referring again to FIG. 2, when disk 43 moves from the position corresponding to the output at A in FIG. 4 to that corresponding to the output at B, the output of inverter 87 goes from low to high. This transition besides changing the inputs to logic network 55 elements is routed from a junction 165 via input line 167 to control counter 69 of the price calculation electronics unit 61. This input will initiate the performance of a price calculation.

Price calculations are performed by a four-function calculator chip 67 such as that commercially available from Texas Instruments Incorporated under its trade designation TMSO117NC. Multiplexer 65 provides the binary contents of the five-digit length counter 63, the binary equivalent of the four-digit unit price dialed in on thumbwheel switches 5, and mathematical instructions to chip 67 in the sequence required by the chip to perform a calculation. Control counter 69 besides being responsive to the input on line 167 to initiate a price calculation further provides a two-digit control count to multiplexer 65, the value of which determines the sequence in which length and price data and mathematical instructions are supplied to chip 67 by multiplexer 65.

Chip 67 performs a price calculation by initially taking in the contents of length counter 63 which is a five-digit binary encoded value. Because the unit price of a material is normally stated in price/yard the chip divides the length counter contents by 36, which is a constant supplied by multiplexer 65, and stores the result. Chip 67 is next supplied with the price per yard as set in by thumbwheel switches 5 and multiplies the prior stored division result by this value. Finally, a constant 0.005 supplied by multiplexer 65 is added to the multiplication product to bring the calculated price to the nearest cent. The result of this addition is the total price for a presently measured length of material. As noted, this sequence of operations is controlled by control counter 69's two digit control count.

Figure 5:
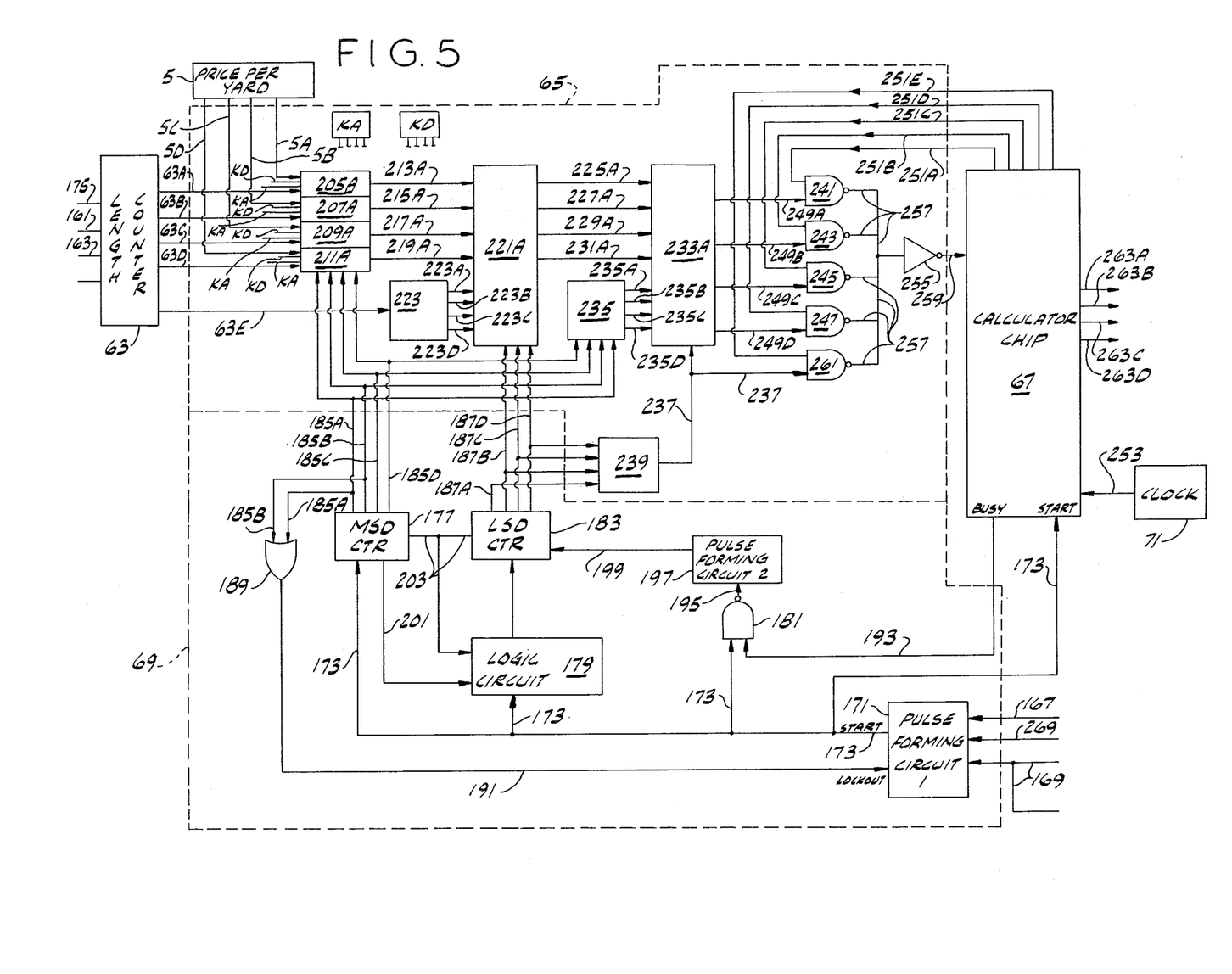
FIG. 5 is a schematic and block diagram of multiplexer, calculator chip and control counter component of the price calculating electronics of the apparatus of FIG. 1.

FIG. 5 illustrates in more detail the interfaces between length counter 63, unit price thumbwheel switches 5, multiplexer 65, chip 67, control counter 69 and clock 71.

In more detail now, prior to beginning the measurement of a length of material the operator or salesperson by depressing reset switch 15 or moving start lever 23 generates a signal on line 169 which is an input to a pulse forming circuit 171 of control counter 69. In response, pulse forming circuit 171 generates a start signal on line 173 which serves to clear the chip 67 internal registers and insure that both the total price indicator 7 and yards indicator 9 read zero. An input is also provided at this time from control counter 69 to length counter 63 on line 175, as shown in FIG. 2, to set the length counter 63 contents to an initial value of 0.2 inches. The purpose for this initial setting will be discussed below.

As material is now drawn between rolls 25 and 41, logic network 55 will provide either a first or second signal, in the manner previously discussed, to increment or decrement the contents of length counter 63. Further, as previously discussed, during each incremental movement of material between the rolls, a signal is provided on line 167 to control counter 69. This signal is applied to pulse forming circuit 171 which, in turn, supplies a start signal on line 173 to the start input of chip 67, counter 177, logic circuit 179 and NAND gate 181. The output of logic circuit 179 to counter 183 and the pulse forming circuit 171 output to counter 177, change the contents of each counter from zero to an initial predetermined value. Counter 177 provides the most significant digit (MSD) of the two-digit count on lines 185A, 185B, 185C and 185D. Counter 183 provides the least significant digit (LSD) of the count on lines 187A, 187B, 187C and 187D, four lines being required in each case because four binary bits are necessary for each digit. OR gate 189 monitors the two most significant bits of the MSD and as long as either is high, which will occur at all times during a calculation, a high input will be provided to OR gate 189 on either line 185A or 185B. OR gate 189 will then provide a high input on line 191 to pulse forming circuit 171 which will lock out circuit 171 from responding to any additional inputs from logic network 55 while a calculation is being performed.

During any operation by chip 67 after a computation is started, a busy pulse will be provided by chip 67 to NAND gate 181 via line 193. At the end of an operation by chip 67, the busy pulse will terminate and gate 181 will provide a signal on line 195 to pulse forming circuit 197 which will respond by supplying a pulse on line 199 to counter 183 to increment the contents of counter 183 one digit. Carry outputs 201 and 203 from counters 177 and 183 are used to signal the end of a decade of counting. From its initial count value, the count value of control counter 69 will be incremented in one digit steps until it reaches the value 00 at which time a calculation will have been completed and the system will be ready to begin a new calculation.

Multiplexer 65 has four sets of four 1-of-4 selector circuits 205, 207, 209, and 211 of which one set 205A, 207A, 209A and 211A is shown in FIG. 5. Each circuit has one binary bit input from length counter 63, the unit price thumbwheel switches 5, the division constant 36 generating circuitry KD and the addition constant 0.005 generating circuitry KA. Four sets of the circuits are needed because four binary bits are needed for each digit of length, price, or constant. Each circuit 205, 207, 209, and 211 is controlled by the MSD of the two-digit count provided by control counter 69. When the MSD is a first value only binary bits representing length digits are transferred on lines 213A, 215A, 217A and 219A to a 1-of-8 selector circuit 221. When the MSD changes to a second value only binary bits representing division constant 36 are transferred. For a third value of the MSD only binary bits representing unit price digits are transferred and finally, when the MSD is a fourth value only binary bits representing the addition constant 0.005 are transferred.

The output of the four sets of 1-of-4 selector circuits are inputs on lines 213, 215, 217 and 219 to four 1-of-8 selector circuits 221, of which one 221A is shown in FIG. 5. The output of circuit 221 is controlled by the LSD of the two-digit control count. Circuit 221 transfers one bit of binary informataion, beginning with the bits representing the appropriate most significant digit of length, price, or constant for each of eight separate values of the LSD of the control count. Because none of the inputs to the 1-of-8 selector circuits comprises eight digits, a bit dependent logic circuit 223 is used to provide zeroes to fill in the remainder of the eight positions not otherwise filled by binary bits. Circuit 223 has a second function with respect to the least significant digit of the length counter. As noted earlier, the contents of counter 63 are initialized to 0.2 inches. The digit 2 represents the initial value of the least significant length digit and the binary bits representing the least significant length digit are supplied to bit dependent logic circuit 223 on line 63E. Circuit 223 is responsive to the binary bit value to supply either a 0 or 5 to circuit 221 which means that the length value ultimately supplied to chip 67 will indicate only a whole or a half inch of length measurement. By setting the contents of counter 63 to 0.2 inches prior to the start of a measurement, the resultant circuit 223 output will more accurately reflect the actually measured length of material since circuit 223 will supply a half-inch indication when three-tenths through seven-tenths of an inch have been measured and will supply a whole inch indication when eight-tenths through one and two-tenths of an inch have been measured.

The parallel output of circuit 221 are supplied on lines 225, 227, 229 and 231 to four 1-of-2 selector circuits 233 of which one 233A is shown in FIG. 5. These inputs represent data for use by chip 67. Binary bits representing mathematical instructions are also supplied to circuit 233 by an instruction forming logic circuit 235 on lines 235A, 235B, 235C and 235D. Circuit 235 is controlled by the MSD of the control count to generate appropriate instructions in the proper sequence.

The output of circuit 233 is controlled by a logic level on line 237 from a logic circuit 239. Circuit 239 is responsive to the LSD of the control count being one of eight values to provide a first output level and responsive to the LSD being a ninth value to provide a second output level. When circuit 239's output to circuit 233 is the first level, binary bits representing data are supplied to one input of NAND gates 241, 243, 245 and 247 on lines 249A, 249B, 249C and 249D respectively. The four binary bits supplied to the NAND gates are now the binary bits representing only one digit of the appropriate data or instruction because chip 67 requires a serial data input rather than the parallel inputs used in multiplexer 65. When the output of circuit 239 is the second level, the binary bits representing instructions are supplied to one input of the NAND gates. Chip 67 provides a series of timing pulses on lines 251A, 251B, 251C and 251D to the NAND gates. The timing pulses on line 215B are delayed in time by chip 67 relative to those applied to line 251A; those on 251C delayed with respect to those on 251B, and so forth, so that a serial data train is provided to chip 67. These timing pulses from chip 67 are derived from timing pulses provided to chip 67 by clock circuit 71 on line 253. The NAND gate outputs are commonly inputted to inverter 255 on line 257 and the inverter output is a serial train of bits on line 259 to the chip 67 input. The output of NAND gate 261 is a flag bit to the chip 67 internal logic to indicate whether the other four bits supplied to the chips are to be interpreted as data or instructions. The input on line 237 to gate 261 is the same first or second level input provided to circuit 233. The timing pulse for this gate is provided from chip 67 on line 251E.

After a computation has been completed within chip 67, binary bits representing the total calculated price and the measured yardage are supplied on output lines 263A, 263B, 263C and 263D to chip/display interface circuit 73 shown in FIG. 2. Interface circuit 73 supplies the bits representing total price on line 265 to light-emitting diode driver circuits which control the whole yardage display 9.

As previously indicated, price calculations are continuously performed during a material measurement in response to initiation pulses on line 167 from logic network 55 to pulse forming circuit 171 of control counter 69. Also as previously noted, a price calculation can be initiated after a measurement is complete by depressing recompute switch 17 which similarly supplies an intiation pulse to circuit 171 of control counter 69 on line 269.

Figure 6:
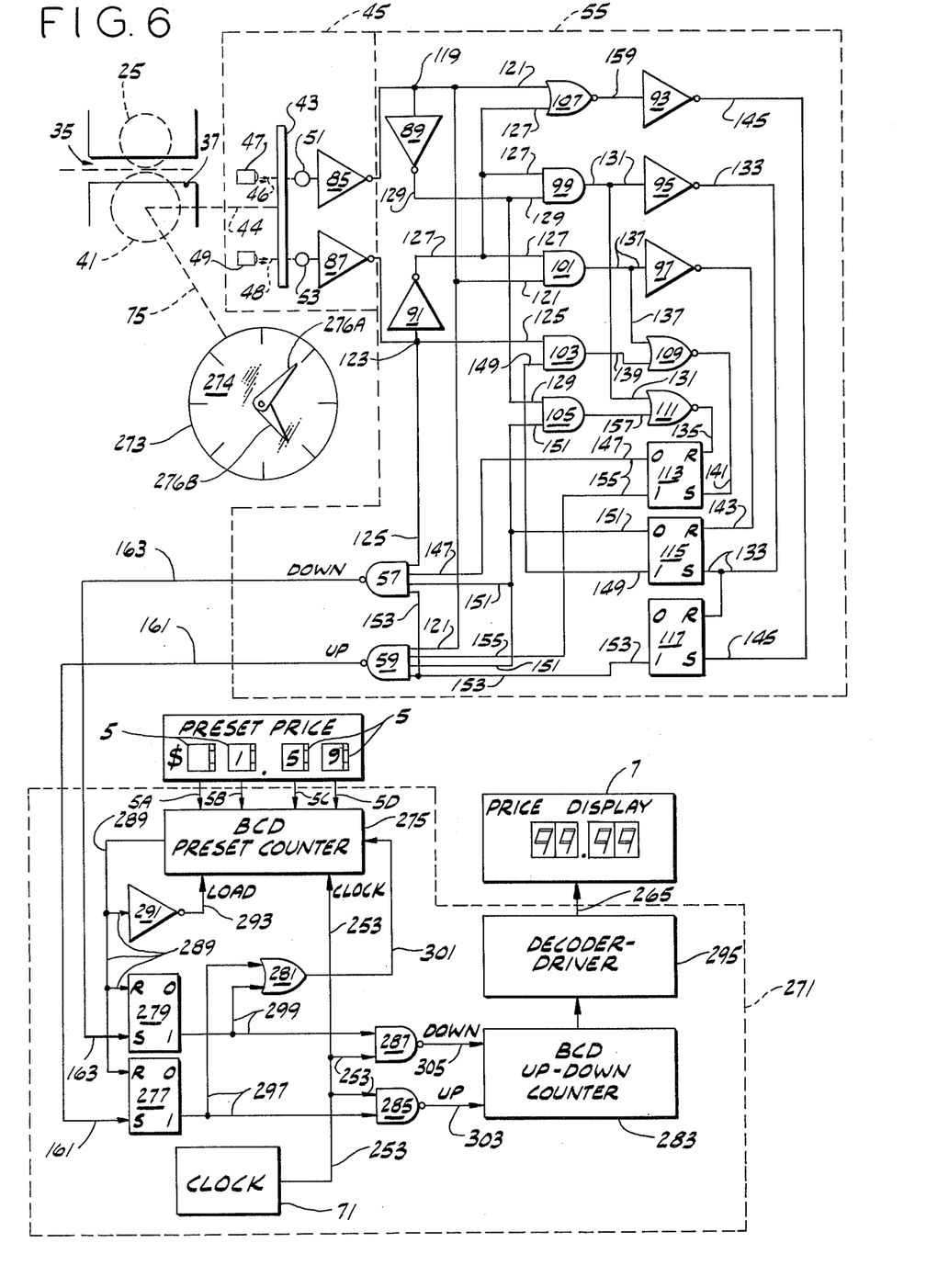
FIG. 6 is a block diagram of another embodiment of a direction sensing and price calculating system of the present invention.

Referring now to FIG. 6 a block diagram of another apparatus of the present invention is shown. As in the previously described apparatus thumbwheel switches 5 are provided to enter a desired unit price per yard of the material to be measured, as are rolls 25 and 41 between which the material is drawn, direction sensor 45 for detecting the direction of material movement between the rolls, logic network 55 which determines when material is pulled between the rolls in either a forward or reverse direction an incremental length and to provide a corresponding output signal. However, instead of utilizing a price calculator 61, a burst counter 271 is employed. This counter is responsive to the output signals from logic network 55 to add or substract from the total price an amount equal to the price of each incremental amount of material measured. Price display 7 gives a visual indication of total price, and a length display 273 provides a visual indication of the total yardage of material measured. Rather than the fractional yardage indicator 11 used in the first embodiment, dial face 274 of length display 273 is calibrated in whole and eighths of yards. Indicator hands 276A (for whole yards) and 276B (for eighths of yards) are driven by a gear train represented by dashed line 75. The gear train is coupled to a shaft which is driven by measuring roll 41. Thus, as material is drawn between rolls 25 and 41, hands 276A and 276B will rotate around dial face 274 to indicate the whole and fractional amount of yardage measured.

The elements and operation of direction sensor 45 and logic network 55 have been previously described and explained.

Burst counter 271 includes a presettable counter 275 whose present count is established by the thumbwheel switches 5, and which, when enabled, counts a preset number of pulses and then resets until again enabled. Clock 71 provides pulses to counter 275 on line 253, the pulse repetition rate of the clock 71 output being very high (e.g. 250 KHZ). The high pulse repetition rate output of clock 71 is to insure that burst counter 271 will respond to an output signal of logic network 55 to complete a price computation before the next output signal of network 55 occurs, regardless of how fast the operator can draw the material between rolls 25 and 41. Flip-flops 277 and 279 are responsive to the output signals of logic network 55 on lines 161 and 163 respectively to provide an enabling signal through an OR gate 281 to counter 275. A reversible accumulating counter 283 is supplied with the same timing pulses provided to counter 275 whenever either a NAND gate 285 or 287 is supplied with a signal from flip-flop 277 or 279 respectively. After presettable counter 275 is enabled and counts the preset number of pulses, an output is supplied on line 289 to reset flip-flop 277 or 279 which will disenable counter 275. This output signal is inverted by inverter 291 and applied back to counter 275 on line 293 to reset counter 275 to its preset value. Interface circuit 295 takes the counter 283 contents and converts them to control signals for the light-emitting diode driver circuits of price display 7.

Presettable counter 275 can count to a maximum value of 9999 and when it does, it supplies an output pulse indicative thereof. The initial value of counter 275 is established by the thumbwheel switches 5 so that if the switches 5 in FIG. 6 are set as shown, counter 275 will have an initial preset value of 9840 which is 9999−0159. Counter 275 will reset to the value 9840 any time it is reset, so long as the thumbwheel switches 5 settings are maintained. Whenever counter 275 is enabled, it counts the pulses supplied on line 253 by clock oscillator 71 until it reaches the value 9999, or in this example 159 pulses. As noted, the pulse repetition rate of clock 71 is very high, since unlike the calculation system previously discussed wherein the clock 71 output was used for timing purposes only, this system must perform a price computation every time an output signal from logic network 55 occurs.

Counter 275 is enabled whenever either a signal is applied on line 161 to the S input of flip-flop 277 or on line 163 to the S input of flip-flop 279. When either flip-flop 277 or 279 is set, the 1 output of that flip-flop goes high. A high on either line 297 or 299 to OR gate 281 makes its output high on line 301 to counter 275. A high on line 301 enables counter 275 and permits it to count the pulses supplied by clock 71. Further, a high on line 297 will allow NAND gate 285 to pass pulses on line 253 to counter 283 via input line 303, which pulses will be used to increment the contents of counter 283. Similarly, a high on line 299 will allow NAND gate 287 to pass pulses on line 253 to counter 283 via input line 305, which pulses will be used to decrement the contents of counter 283. When counter 275 contents reach 9999, an output pulse is supplied on line 289 to the R input of flip-flops 277 and 279. This pulse resets the flip-flops making the 1 output of each low so that OR gate 281's output to counter 275 goes low inhibiting counter 275 from counting any additional pulses. The output of flip-flops 277 and 279 on lines 297 and 299 to NAND gates 285 and 287 now being low, no additional pulses are passed by the NAND gates to counter 283. Finally, the counter 275 output pulse on line 289 is inverted by inverter 291 and fed back into counter 275 on line 293 to reset counter 275 to its preset value.

Since the contents of counter 283 are incremented or decremented with each incremental movement of movement of material between rolls 25 and 41 in either direction, the price display 7 indication will change in response to each incremental movement of material.

In view of the above it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. Apparatus for calculating the price of a measured length of material comprising:

means for sensing movement in either of two directions of a material having a length to be measured and a price per unit length, the sensing means including a light source, a pair of detectors responsive to the presence or absence of light and a disk responsive to the movement of material in either direction and having first and second optically encoded bands respectively interposed along optical paths from the light source to the detectors alternately to block and transmit light from said source to said respective detectors in a phased sequence which is a function of the direction of movement of the material, said optically encoded bands comprising concentric rings of alternating opaque and light-transmitting zones with the positions of the zones in the first band being shifted with respect to the positions of the zones in the second band whereby as the disk is rotated by the movement of the material the sequence of transmission and interruption of light by the first band relative to that of the second band differs in phase as a function of the direction of movement of the material, and first and second roll means for the insertion therebetween of said material whose length is to be measured and to which the disk is coupled whereby the direction of rotation of the roll means as a material moves therebetween in either direction determines the direction of rotation of the disk;

means into which the unit price of the material is entered and from which a binary value related thereto may be derived;

logic means responsive to the sensing means for determining the direction of material movement and for providing a first signal representative of the distance of the material moves in a forward direction and a second signal representative of the distance the material moves in a reverse direction;

means responsive to the first and second signals and to the binary value derived from the unit price to provide an output signal representing the total price of the measured length of material, said signal responsive means including a length counter whose contents are incremented in response to the first signal and decremented in response to the second signal whereby the contents of the length counter represent the binary value of the total measured length of material and means responsive to the end of a bolt of material passing through the roll means to provide an indication thereof, said bolt end responsive means further including switch means for incrementing the contents of the length counter an amount equal to an offset between the roll means and a predetermined reference point at which said material is initially aligned; and display means responsive to the output signal for indicating the total price of a measured length of material.

* * * * *